US008689026B2

(12) United States Patent
Livni et al.

(10) Patent No.: US 8,689,026 B2
(45) Date of Patent: Apr. 1, 2014

(54) ENHANCING POWER EFFICIENCY IN A WIRELESS INTERNET CARD

(75) Inventors: Jonathan Livni, Tel Aviv (IL); Moshe Noah, Yokneam (IL); Eran Friedlander, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 1225 days.

(21) Appl. No.: 12/124,026

(22) Filed: May 20, 2008

(65) Prior Publication Data

US 2009/0292933 A1      Nov. 26, 2009

(51) Int. Cl.
*G06F 1/26* (2006.01)
*H04B 7/00* (2006.01)

(52) U.S. Cl.
USPC ............ 713/320; 713/310; 455/41.2; 455/73

(58) Field of Classification Search
USPC ........................ 713/310, 320; 455/41.2, 73
See application file for complete search history.

(56) References Cited

U.S. PATENT DOCUMENTS

| | | | | |
|---|---|---|---|---|
| 5,471,625 | A * | 11/1995 | Mussemann et al. ......... | 713/322 |
| 6,842,607 | B2 | 1/2005 | Godfrey et al. | |
| 6,988,221 | B2 * | 1/2006 | Rasmussen et al. ............ | 714/12 |
| 7,072,616 | B2 | 7/2006 | Godfrey | |
| 7,340,236 | B2 * | 3/2008 | Liang et al. ................ | 455/277.2 |
| 7,356,717 | B2 * | 4/2008 | Shiraga et al. ................ | 713/300 |
| 7,852,818 | B2 * | 12/2010 | Feder et al. .................... | 370/338 |
| 7,856,000 | B2 * | 12/2010 | Ross ............................. | 370/338 |
| 7,899,396 | B2 * | 3/2011 | Meylan et al. ............... | 455/41.2 |
| 8,064,932 | B2 * | 11/2011 | Tsai .............................. | 455/458 |
| 2004/0048577 | A1 * | 3/2004 | Godfrey et al. ............ | 455/67.11 |
| 2004/0116075 | A1 * | 6/2004 | Shoemake et al. ........... | 455/41.2 |
| 2004/0192222 | A1 * | 9/2004 | Vaisanen et al. ................ | 455/78 |
| 2005/0059347 | A1 * | 3/2005 | Haartsen ...................... | 455/41.2 |

(Continued)

FOREIGN PATENT DOCUMENTS

| | | |
|---|---|---|
| CN | 101588581 A | 11/2009 |
| EP | 2279645 A2 | 2/2011 |

(Continued)

OTHER PUBLICATIONS

Yoon, Nan Young, International Search Report, Patent Cooperation Treaty, PCT/US2009/042400, Dec. 18, 2009, 3 pages, Korean Intellectual Property Office, Daejeon, Republic of Korea.

(Continued)

*Primary Examiner* — Kim Huynh
*Assistant Examiner* — Zahid Choudhury
(74) *Attorney, Agent, or Firm* — Sutherland Asbill & Brennan LLP

(57) ABSTRACT

A wireless internet card to support enhancing power efficiency. The wireless internet comprises a front end comprising shared frequency resources. The wireless internet card also comprises a first wireless block and a second wireless block. While the first wireless block is in low-power mode, the second wireless block may get access to the shared radio frequency resources without waking-up the first wireless block thus enhancing the power efficiency. The second wireless block sends a request to the first wireless block to use shared radio frequency resources. A coexistence block coupled to the second wireless block and the first wireless block may wait for a time duration to elapse after the request is received and may allow the second wireless block to use the shared radio frequency resources if the time duration is elapsed.

27 Claims, 2 Drawing Sheets

(56) References Cited

U.S. PATENT DOCUMENTS

| | | | |
|---|---|---|---|
| 2006/0053318 A1* | 3/2006 | One | 713/300 |
| 2006/0292986 A1 | 12/2006 | Bitran et al. | |
| 2007/0008925 A1 | 1/2007 | Dravida et al. | |
| 2007/0079161 A1* | 4/2007 | Gupta | 713/324 |
| 2007/0135162 A1* | 6/2007 | Banerjea et al. | 455/556.1 |
| 2007/0238483 A1* | 10/2007 | Boireau et al. | 455/553.1 |
| 2009/0017756 A1* | 1/2009 | Tsfaty et al. | 455/41.2 |
| 2009/0055504 A1* | 2/2009 | Xie et al. | 709/207 |
| 2009/0109888 A1* | 4/2009 | Xie et al. | 370/311 |
| 2010/0165962 A1* | 7/2010 | Tzoreff et al. | 370/338 |

FOREIGN PATENT DOCUMENTS

| | | | |
|---|---|---|---|
| JP | 09-064935 A | 3/1997 | |
| JP | 9-326751 A | 12/1997 | |
| JP | 11-055727 A | 2/1999 | |
| JP | 2003-258817 A | 9/2003 | |
| JP | 2005-260426 A | 9/2005 | |
| JP | 2009-500957 A | 1/2009 | |
| KR | 10-2010-0130202 A | 12/2010 | |
| TW | 200952537 A | 12/2009 | |
| WO | 2009/142891 A2 | 11/2009 | |
| WO | WO-2009/142891 A2 | 11/2009 | |
| WO | 2009/142891 A3 | 2/2010 | |

OTHER PUBLICATIONS

International Preliminary Report on Patentability for International Patent Application No. PCT/US2009/042400, Mailed Dec. 2, 2010, 7 pages.

First Non-Final Office Action for Chinese Patent Application No. 200910203044.3 Mailed Aug. 23, 2011, 6 Pages.

Office Action received for Japanese Patent Application No. 2011-501024, mailed on Aug. 14, 2012, 4 pages of English Translation and 4 pages of Japanese Office Action.

Office Action received for Chinese Patent Application No. 200910203044.3; mailed on Aug. 23, 2011; 6 pages including 2 pages of English Translation.

Office Action received for Korean Patent Application No. 10-2010-7021345, mailed on Jan. 27, 2012, 2 pages of English Translation.

Office Action received for European Patent Application No. 09751120.8, mailed on Dec. 29, 2010, 2 pages.

Office Action received for Taiwan Patent Application No. 98115113, mailed on Sep. 17, 2012, 1 page of Search Report and 6 pages of Taiwan Office Action.

Office Action received for Japanese Patent Application No. 2011-501024, mailed on Jun. 4, 2013, 6 pages of Office action including 3 pages of English Translation.

* cited by examiner

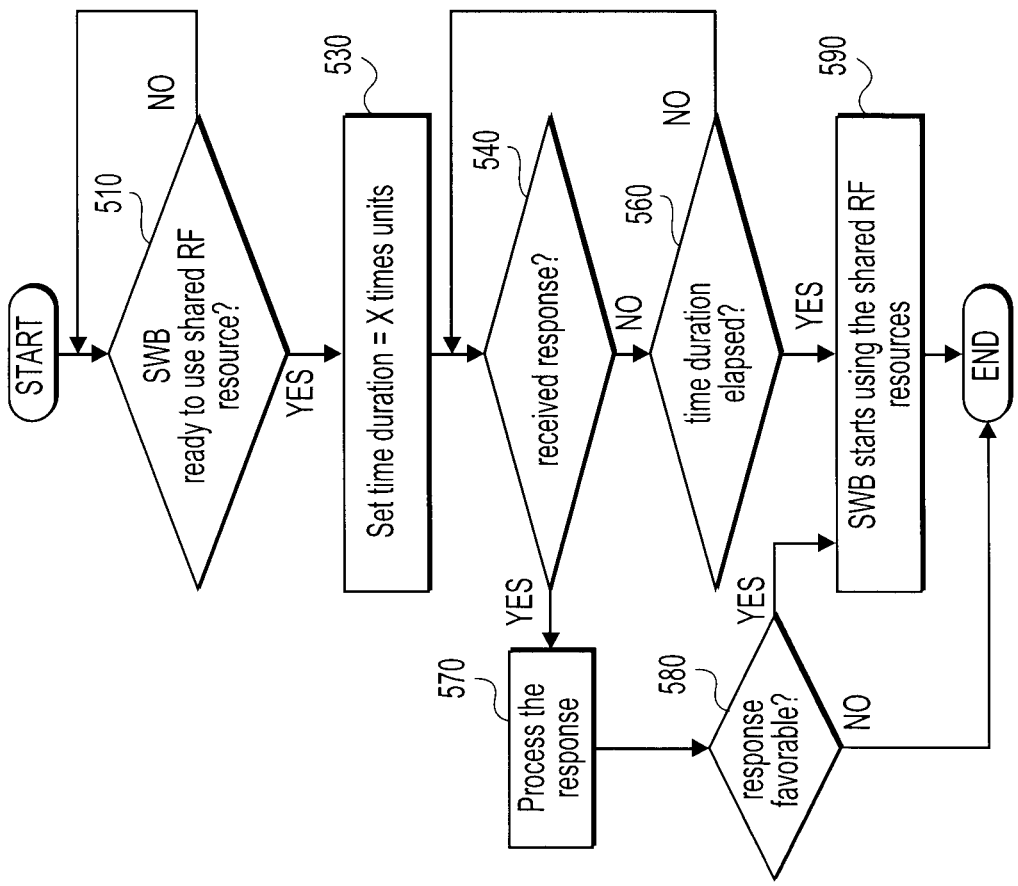
FIG. 5
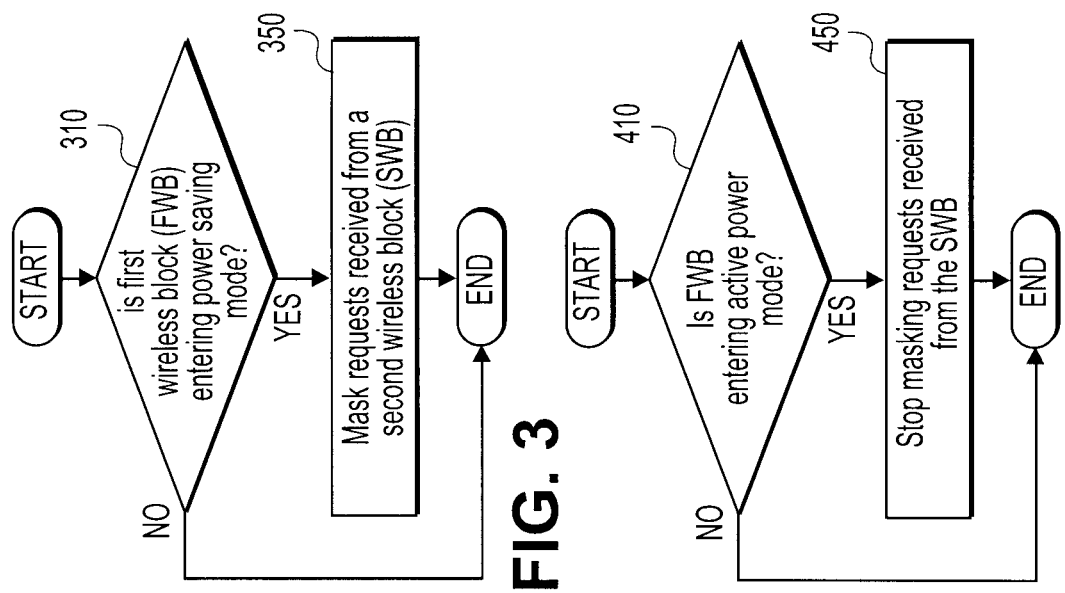
FIG. 3
FIG. 4

ENHANCING POWER EFFICIENCY IN A WIRELESS INTERNET CARD

BACKGROUND

The demand for internet connectivity is ever increasing at a rapid pace and internet service providers (ISPS) are deploying wireless connectivity to provide last mile connectivity. The equipment manufacturers are supporting wireless technology to provide last mile connectivity by provisioning wireless internet cards in the devices such as laptops, desktops, tablet PCs (personal computers), medical devices, mobile internet devices (MID) and handheld devices. The wireless internet cards may also be equipped to support co-existence of two or more wireless standards. For example, the wireless interface cards may support coexistence of the IEEE® 802.11 standards based Wi-Fi and the IEEE® 802.16 standards based Worldwide Interoperability for Microwave Access (Wi-MAX).

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 depicts flow-chart, which illustrates operation of a first wireless block entering a power saving mode according to one embodiment.

FIG. 4 depicts flow-chart, which illustrates operation of the first wireless block entering an active power mode according to one embodiment.

FIG. 5 depicts flow-chart, which illustrates operation of a second wireless block, which may support enhancement of power efficiency according to one embodiment.

DETAILED DESCRIPTION

The following description describes embodiments of enhancing power efficiency in a wireless internet card. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
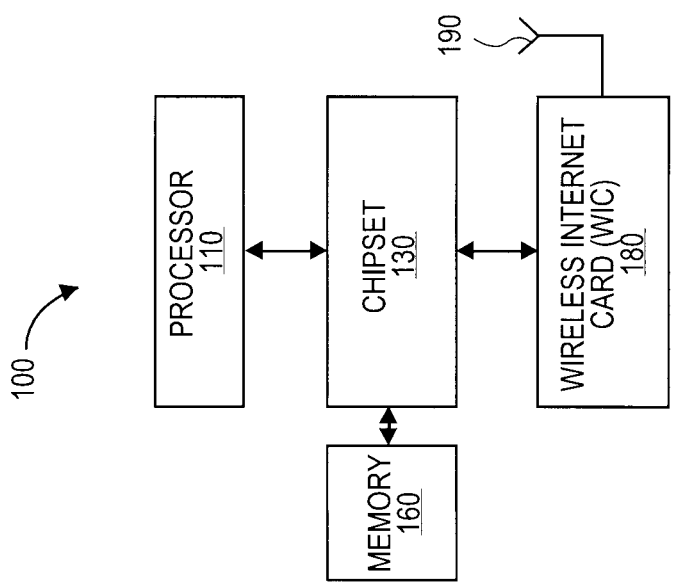
FIG. 1 illustrates a device 100, which may support enhancement of power efficiency according to one embodiment.

A computing device 100, which may support enhancement of power efficiency in accordance with one embodiment is illustrated in FIG. 1. The computing device 100 may comprise a processor 110, a chipset 130, a memory 160, and a wireless internet card 180.

The chipset 130 may comprise one or more integrated circuits or chips that operatively couple the processor 110, the memory 160, and the wireless internet card 180. In one embodiment, the chipset 130 may comprise controller hubs such as a memory controller hub and an I/O controller hub to, respectively, couple with the memory 160 and the wireless internet card 180. The chipset 130 may receive transactions generated by the wireless internet card 180 on links such as the PCI Express links and may forward the transactions to the processor 110 for further processing or to the memory 160 for storage purpose. Also, the chipset 130 may generate and send transactions to the wireless internet card 180 on behalf of the processor 110.

The memory 160 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the computing system 100.

The processor 110 may manage various resources and processes within the computing system 100 and may execute software instructions as well. The processor 110 may interface with the chipset 130 to transfer data to the memory 160 and the wireless internet card 180. In one embodiment, the processor 110 may receive data units from received by the wireless internet card 180 and may process the data units before storing the data units in the memory 160 or sending the data units back to the wireless internet card 180.

In one embodiment, the wireless internet card 180 may support co-existence of a plurality of protocols based on standards developed for wireless communications. In one embodiment, the wireless internet card 180 may support coexistence of wireless blocks supporting the standards such as IEEE® 802.11 and IEEE® 802.16. In one embodiment, the wireless internet card 180 may comprise logic to enhance power efficiency of the wireless internet card 180. In one embodiment, the wireless internet card 180 may allow a second wireless block (e.g., Wi-MAX block) to use the shared resources without waking-up a first wireless block (e.g., Wi-Fi block).

As the second wireless block accesses the shared resources even without waking-up the a first wireless block, the power that may be consumed by the first wireless block to wake-up and process requests from the second wireless block to access the shared resources may be conserved. In one embodiment, such an approach may enhance the overall power efficiency of the wireless internet card 180. In one embodiment, the wireless internet card 180 may be attached with an antenna 190, which may enable transmission and reception of radio frequency (RF) signals.

Figure 2:
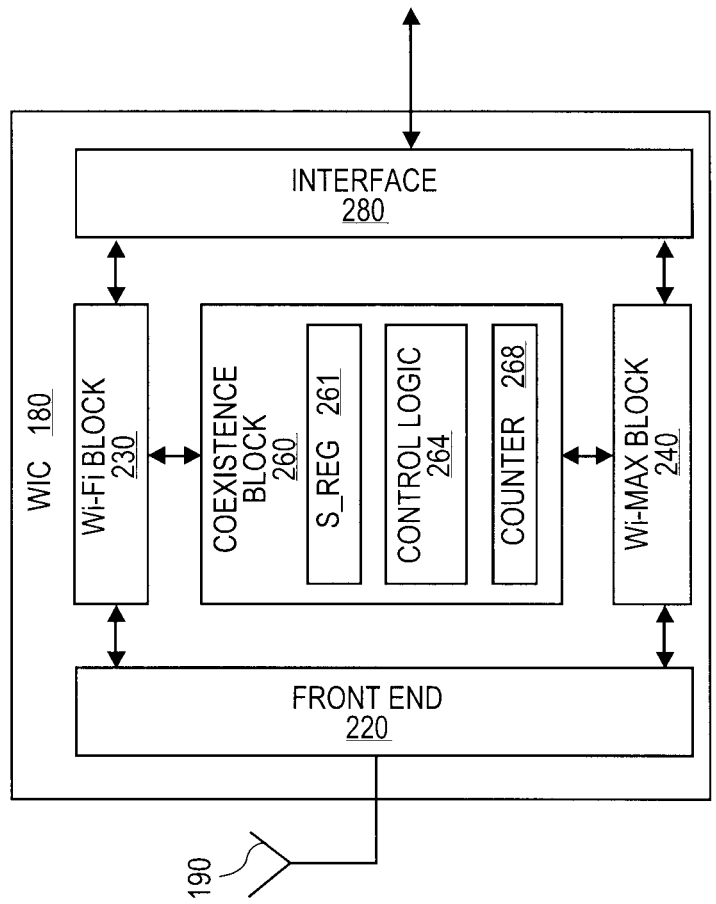
FIG. 2 is a block diagram of a wireless internet card, which may support enhancement of power efficiency according to one embodiment.

FIG. 2 illustrates a block diagram of the wireless internet card 180, which may enhance power efficiency of the wireless internet card 180 in accordance with one embodiment. In one embodiment, the wireless internet card 180 may comprise a front end 220, a Wi-Fi block 230, a Wi-MAX block 240, a co-existence block 260, and an interface 280.

In one embodiment, the interface 280 may couple the wireless internet card 180 to the chipset 130. In one embodiment, the interface 280 may perform protocol conversions before transferring the data units between the chipset 130 and the wireless internet card 180. In one embodiment, the interface 280 may provide 210 may provide physical, electrical, and protocol interfaces to transfer the data units between the chipset 130 and the wireless internet card 180.

In one embodiment, the front end 220 may comprise radio frequency components such as the low noise amplifier (LNA), mixers, reference oscillators, filters, baseband processors, data converters, and such other components. The radio frequency components may together be referred to as RF resource. In one the wireless internet card 180 may comprise a single set of RF resources, which may be shared by the Wi-Fi block 230 and the Wi-MAX block 240 on time-sharing basis. Such an approach may reduce the real estate of the integrated circuit, which in turn may reduce the cost of the integrated circuit.

In one embodiment, the front-end 220 may transmit and receive signals over the antenna 190. In one embodiment, the front end 220 may receive RF signals through the antenna 190, process the RF signals to generate data bits, and pass the data bits to one of the Wi-Fi block 230 or the Wi-MAX block 240. In one embodiment, the front end 220 may receive data bits from one of the Wi-Fi block 230 or the Wi-MAX block 240, convert the data bits into RF signals of appropriate frequency range and transfer the RF signal through the antenna 190. In one embodiment, a single set of RF resource may be shared by the wireless blocks that may co-exist. In one embodiment, the RF resources may comprise components such as a low noise amplifier, a mixer, a local oscillator, intermediate frequency (IF) amplifiers, and data converters. Provisioning dedicated RF resources for each of the wireless blocks may be cost prohibitive.

In one embodiment, the Wi-Fi block 230 may allow the wireless internet card 180 to transmit and receive data units based on IEEE® 802.11 protocol. In one embodiment, the Wi-Fi block 230 may use coding techniques such as orthogonal frequency division multiplexing (OFDM) or complimentary code keying (CCK). In one embodiment, the Wi-Fi block 230 may receive data units from the interface 280 and transfer the data units to the front-end 210. Also, the Wi-Fi block 230 may transfer the data bits received from the front-end 210 to the interface 280 after processing the data bits.

In one embodiment, the Wi-Fi block 230 may enter a sleep mode after detecting 'no-activity' or 'low-activity' condition. In one embodiment, the Wi-Fi block 230 may wake-up (enter active power mode) from the sleep mode in response to receiving a request and process the request. In one embodiment, the Wi-Fi block 230 operating in a sleep state or low power mode may reduce power consumption. However, the Wi-Fi block 230 may consume power to wake-up and process the requests. Such frequent wake-ups may offset the advantage of power savings gained by entering sleep or low power states.

In one embodiment, the Wi-MAX block 240 may allow wireless internet card 180 to transmit and receive data units based on IEEE® 802.16 protocol. In one embodiment, the Wi-MAX block 240 may also use coding techniques such as orthogonal frequency division multiplexing (OFDM). In one embodiment, the Wi-MAX block 240 may receive data units from the interface 280 and transfer the data units to the front-end 210. Also, the Wi-MAX block 240 may transfer the data bits received from the interface 280 to the front end 220. In one embodiment, the Wi-MAX block 240 and Wi-FI block 230 may co-exist and may share the RF resources provisioned in the front end 220.

In one embodiment, the Wi-MAX block 240 may also enter sleep mode after detecting 'no-activity' or 'low-activity' condition. In one embodiment, the Wi-MAX block 240 may wake-up (enter active power mode) from the sleep mode in response to receiving a request. However, frequent wake-ups may offset the advantage of power savings gained by entering sleep or low power state.

In one embodiment, the co-existence block 260 may enhance the power efficiency of the wireless internet card 180 by reducing the frequency at which the Wi-Fi block 230 or the Wi-MAX block 240 may wake-up from the low-power state. In one embodiment, the co-existence block 260 may handle the assignment of RF resources to the block that generates request to use the RF resources. In one embodiment, the co-existence block 260 may be provisioned as a separate logic block or may be implemented as a portion of the Wi-Fi block 230 and Wi-MAX block 240.

In one embodiment, the co-existence block 260 may handle the requests from a wireless block A and assign the RF resources to the wireless block A without waking-up a wireless block B. In one embodiment, as the coexistence block 260 ensures that the wireless block B is not woken-up from the sleep state, the power that may be consumed by the wireless block B to wake-up and service the request is conserved.

In one embodiment, the co-existence block 260 may comprise a status register S_REG 261, a control logic 264, and a counter 268. In one embodiment, the S_REG 261 may comprise a first bit and a second bit, which may be respectively set or reset by the Wi-Fi block 230 and the Wi-MAX block 240. In one embodiment, the first and the second bit may be set while the Wi-Fi block 230 and the Wi-MAX block 240 enter a low-power mode and may be reset while entering an active power mode.

In one embodiment, the control logic 264 may determine the time duration that the coexistence block 260 may wait before allowing the Wi-MAX block 240 to use the shared RF resources, while the Wi-Fi block 230 is in low-power mode. In one embodiment, the counter 268 may be used the count the time duration after a request is received from the Wi-MAX block 240.

FIG. 3 depicts flow-chart, which illustrates operation of a coexistence block masking the requests directed to the first wireless block according to one embodiment.

In one embodiment, the Wi-Fi block 230 may be referred to as a first wireless block (FWB) and the Wi-MAX block 240 may be referred to as a second wireless block (SWB) assuming that the Wi-Fi block 230 is in low-power state and the Wi-MAX block 240 may be generating requests to use the RF resources. However, similar technique may be used if the Wi-MAX block 240 is in sleep-mode and if the Wi-Fi block 230 is generating requests to use the RF resources.

In block 310, the co-existence block 260 may check if the first wireless block (FWB) is entering a low-power or power saving mode and control passes to block 350 if the FWB is entering a power saving mode. In one embodiment, the FWB may set the first bit of the status register S_REG 261 before entering the low-power mode. Likewise, in one embodiment, the SWB may set a second bit of the status register S_REG 261 before entering the low-power mode. In one embodiment, the coexistence block 260 may check the status of the first bit of the S_REG 21 to determine if the FWB is entering the low-power mode.

In block 350, the co-existence block 260 may mask the requests received from the second wireless block (SWB). In one embodiment, the coexistence block 260 may mask the requests received from the Wi-MAX block 240 after detecting that the WI-FI block 230 is in low-power mode. In one embodiment, the coexistence block 260 may also ensure that the Wi-MAX block 240 is assigned the RF resources. In one embodiment, the assignment of RF resources to the SWB without waking-up the FWB is illustrated in FIG. 5.

In one embodiment, the coexistence block 260 may check for a bit value of a resource_assign field in the request sent by the SWB and a bit value of a power_state field set by the FWB. In one embodiment, the coexistence block 260 may mask the request sent by the SWB if the bit value of both the resource_assign field and the power_state field is logic 1.

FIG. 4 depicts flow-chart, which illustrates operation of a coexistence block that stops masking the requests directed to the first wireless block according to one embodiment.

In block 410, the co-existence block 260 may check if the first wireless block (FWB) is entering an active power mode and control passes to block 450 if the FWB is entering an active power mode. In one embodiment, the FWB may reset the first bit of the status register S_REG 261 before entering the active power mode. Likewise, in one embodiment, the SWB may reset a second bit of the status register S_REG 261 before entering the active power mode. In one embodiment, the coexistence block 260 may check the status of the first bit of the S_REG 21 to determine if the FWB is entering the active power mode.

In block 450, the co-existence block 260 may stop masking of the requests received from the second wireless block (SWB). In one embodiment, the coexistence block 260 may stop masking of the requests received from the Wi-MAX block 240 after detecting that the Wi-Fi block 230 is in active power mode.

In one embodiment, the coexistence block 260 may check for a bit value of a resource_assign field in the request sent by the SWB and a bit value of a power_state field set by the FWB. In one embodiment, the coexistence block 260 may stop masking the request sent by the SWB if the bit value of the resource_assign field is logic 0 and if the bit value of the power_state field is logic 1.

FIG. 5 depicts flow-chart, which illustrates operation of the second wireless block, which may support enhancement of power efficiency according to one embodiment.

In block 510, the coexistence block 260 may check if the SWB is ready to use the shared RF resources and control passes to block 530 if the SWB is ready to use the resources. In one embodiment, the coexistence block 260 may check the bit value of the resource_assign field of the request and if the bit value of the resource_assign field is logic 1, the coexistence block 260 may cause control to pass to block 530.

In block 530, the coexistence block 260 may set a counter to count time duration. In one embodiment, the control logic 264 of the coexistence block 260 may determine the time duration.

In block 540, the SWB may check if a response is received. In one embodiment, the FWB may send a response if the FWB is in active power mode and control passes to block 560 if the response is not received and to block 570 otherwise.

In block 560, the coexistence block 260 may check if the time duration is elapsed and control passes to block 590 if the time duration is elapsed and back to block 540 otherwise. In one embodiment, the coexistence block 260 may allow the SWB to use the shared RF resources after the time duration elapses. Also, the SWB may be allowed to use the shared RF resources without waking-up the FWB from the sleep-state. In one embodiment, the coexistence block 260 may send a signal to the SWB, which indicates that the SWB may se the shared RF resources.

In block 570, the SWB may process the response. In block 580, the SWB may check if the response is favorable and control passes to block 590 if the response is favorable. In one embodiment, the response may be deemed as favorable if the FWB allows the SWB to use the shared RF resources.

In block 590, the SWB may start to use the shared RF resources. As the SWB may use the shared RF resources without the FWB having to wake-up the requests, the overall power efficiency of the wireless internet card 180 may be enhanced.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a wireless internet card, comprising:
sending a request to use shared radio frequency resources shared by a first and second wireless block, wherein the second wireless block sends the request to the first wireless block while the first wireless block is in or entering a low-power mode,
checking if a response is received,
using the shared radio frequency resources if the response indicates that the shared radio frequency resources is available to be used,
if a response is not received, waiting for a predetermined time duration to elapse after the request is received, and
allowing the second wireless block to use the shared radio frequency resources if the predetermined time duration is elapsed, wherein the first wireless block continues to operate in the low-power mode while the second block is allowed to use the shared radio frequency resources.

2. The method of claim 1, wherein the first wireless block and the second wireless block coexist in a wireless internet card.

3. The method of claim 1, wherein the first wireless block and the second wireless block share the radio frequency resources.

4. The method of claim 3, wherein the request is sent from the second wireless block while the control of the shared radio frequency is with the first wireless block.

5. The method of claim 4, wherein the first wireless block operates on a first wireless standard and the second wireless block operates on a second wireless standard.

6. The method of claim 1 further comprises starting to mask the request while the first wireless block is entering the low-power mode.

7. The method of claim 6 further comprises stopping to mask the request while the first wireless block is entering an active power mode.

8. An apparatus comprising:
a front end comprising shared frequency resources,
a first wireless block coupled to the front end,
a second wireless block coupled to the front end, wherein the second wireless block is to send a request to the first wireless block to use shared radio frequency resources shared by the first wireless block and the second wireless block while the first wireless block is in or entering a low-power mode, and
a coexistence block coupled to the second wireless block and the first wireless block, wherein the coexistence block is to check if a response is received and to allow the shared radio frequency resources to be used by the second wireless block if the response indicates that the shared frequency resources is available to be used, and if a response is not received, wait for a predetermined time duration to elapse after the request is received and to allow the second wireless block to use the shared radio frequency resources if the predetermined time duration is elapsed, wherein the first wireless block is to operate in the low-power mode while the second block is allowed to use the shared radio frequency resources.

9. The apparatus of claim 8, wherein the first wireless block and the second wireless block coexist in a wireless internet card.

10. The apparatus of claim 8, wherein the first wireless block and the second wireless block share the radio frequency resources.

11. The apparatus of claim 10, wherein the second wireless block is to send the request to the first wireless block while the first wireless block is in control of the shared radio frequency resource.

12. The apparatus of claim 11, wherein the first wireless block operates on a first wireless standard and the second wireless block operates on a second wireless standard.

13. The apparatus of claim 12, the coexistence block further comprises
a counter, wherein the counter is to keep track of the time duration, and
a control logic coupled to the counter, wherein the control logic is to determine the time duration.

14. The apparatus of claim 13, the coexistence block further comprises a status register coupled to the control logic, wherein a first bit of the status register is set by the first wireless block while the first wireless block enters the low-power mode and resets the first bit while entering the active power mode.

15. The apparatus of claim 8, wherein the first wireless block is to start mask the request while the first wireless block is entering the low-power mode.

16. The apparatus of claim 15, wherein the first wireless block is to mask the request while the first wireless block is entering an active power mode.

17. The apparatus of claim 16, wherein first wireless block is to stop masking the request while the first wireless block is entering an active power mode.

18. A machine-readable non-transitory storage medium comprising a plurality of instructions that in response to being executed result in a processor performing a method comprising:
sending a request to use shared radio frequency resources shared by a first wireless block and a second wireless block, wherein the second wireless block sends the request to the first wireless block while the first wireless block is in or entering a low-power mode,
checking if a response is received,
using the shared radio frequency resources if the response indicates that the shared radio frequency resources is available to be used,
if a response is not received, waiting for a predetermined time duration to elapse after the request is received, and
allowing the second wireless block to use the shared radio frequency resources if the predetermined time duration is elapsed, wherein the first wireless block continues to operate in the low-power mode while the second block is allowed to use the shared radio frequency resources.

19. The machine-readable non-transitory storage medium of claim 18, wherein the first wireless block and the second wireless block coexist in a wireless internet card.

20. The machine-readable non-transitory storage medium of claim 18, wherein the first wireless block and the second wireless block share the radio frequency resources.

21. The machine-readable non-transitory storage medium of claim 19, wherein the request is sent from the second wireless block while the control of the shared radio frequency is with the first wireless block.

22. The machine-readable non-transitory storage medium of claim 20, wherein the first wireless block operates on a first wireless standard and the second wireless block operates on a second wireless standard.

23. The machine-readable non-transitory storage medium of claim 18, where in the method further comprises starting to mask the request while the first wireless block is entering the low-power mode.

24. The machine-readable non-transitory storage medium of claim 18, where in the method further comprises stopping to mask the request while the first wireless block is entering an active power mode.

25. A system comprising:
a processor,
a chipset coupled to the processor, and
a wireless internet card couple to the chipset, wherein the wireless internet card comprises, a front end comprising shared frequency resources shared by a first wireless block and a second wireless block,
the first wireless block coupled to the front end,
the second wireless block coupled to the front end, wherein the second wireless block is to send a request to the first wireless block to use shared radio frequency resources while the first wireless block is in or entering a low-power mode, and
a coexistence block coupled to the second wireless block and the first wireless block, wherein the coexistence block is to check if a response is received and to allow the shared radio frequency resources to be used by the second wireless block if the response indicates that the shared frequency resources is available to be used, and if a response is not received, wait for a predetermined time duration to elapse after the request is received and to allow the second wireless block to use the shared radio frequency resources if the predetermined time duration is elapsed, wherein the first wireless block is to operate in the low-power mode while the second block is allowed to use the shared radio frequency resources.

26. The system of claim 25, wherein the first wireless block and the second wireless block coexist in a wireless internet card, wherein the first wireless block and the second wireless block share the radio frequency resources.

27. The system of claim 26, wherein the second wireless block is to send the request to the first wireless block while the first wireless block is in control of the shared radio frequency resource.

* * * * *